United States Patent
Benisty

(10) Patent No.: US 11,055,022 B2
(45) Date of Patent: Jul. 6, 2021

(54) STORAGE SYSTEM AND METHOD FOR EARLY HOST COMMAND FETCHING IN A LOW QUEUE DEPTH ENVIRONMENT

(71) Applicant: Western Digital Technologies, Inc., San Jose, CA (US)

(72) Inventor: Shay Benisty, Beer Sheva (IL)

(73) Assignee: Western Digital Technologies, Inc., San Jose, CA (US)

(*) Notice: Subject to any disclaimer, the term of this patent is extended or adjusted under 35 U.S.C. 154(b) by 127 days.

(21) Appl. No.: 16/363,097

(22) Filed: Mar. 25, 2019

(65) Prior Publication Data

US 2020/0310682 A1 Oct. 1, 2020

(51) Int. Cl.
*G06F 3/06* (2006.01)
*G06F 13/16* (2006.01)

(52) U.S. Cl.
CPC .......... *G06F 3/0659* (2013.01); *G06F 3/0605* (2013.01); *G06F 3/0653* (2013.01); *G06F 13/1642* (2013.01); *G06F 3/0679* (2013.01); *G06F 2213/0026* (2013.01)

(58) Field of Classification Search
None
See application file for complete search history.

(56) References Cited

U.S. PATENT DOCUMENTS

| | | | |
|---|---|---|---|
| 5,802,566 A | 9/1998 | Hagersten | |
| 6,529,998 B1 | 3/2003 | Yochai et al. | |
| 6,976,147 B1 | 12/2005 | Isaac et al. | |
| 7,613,883 B2* | 11/2009 | Bellows | G11C 7/1012 365/222 |
| 9,317,204 B2* | 4/2016 | Hahn | G06F 3/0679 |
| 9,626,309 B1* | 4/2017 | Burke | G06F 13/364 |
| 9,996,262 B1* | 6/2018 | Nemawarkar | G06F 3/0604 |
| 10,235,102 B2* | 3/2019 | Richter | G06F 13/42 |
| 10,613,778 B2* | 4/2020 | Hahn | G06F 12/0246 |
| 10,635,355 B1* | 4/2020 | Helmick | G06F 3/061 |
| 10,725,835 B2* | 7/2020 | Benisty | G06F 3/061 |
| 10,769,013 B1* | 9/2020 | MacLaren | G06F 3/0659 |
| 2003/0149837 A1 | 8/2003 | Coker et al. | |
| 2008/0229071 A1* | 9/2008 | Shioya | G06F 12/0862 712/207 |
| 2011/0219208 A1* | 9/2011 | Asaad | G06F 9/06 712/12 |
| 2016/0283116 A1* | 9/2016 | Ramalingam | G06F 3/0611 |
| 2017/0123667 A1* | 5/2017 | Richter | G06F 13/42 |

(Continued)

*Primary Examiner* — Isaac T Tecklu
(74) *Attorney, Agent, or Firm* — Brinks Gilson & Lione

(57) ABSTRACT

A storage system and method are provided for early host command fetching in a low queue depth environment. In one embodiment, a storage system is provided comprising a memory and a controller. The controller is configured to: determine a host's behavior for updating a submission queue; begin executing at least one command based on the determined host's behavior before receiving notification from the host that the host has updated the submission queue; receive notification from the host that the host has updated the submission queue; determine whether the submission queue has been updated with the at least one command that the controller began executing; and in response to determining that the submission queue has been updated with the at least one command that the controller began executing, continue executing the at least one command.

20 Claims, 10 Drawing Sheets

(56) References Cited

U.S. PATENT DOCUMENTS

| | | | |
|---|---|---|---|
| 2017/0199765 A1 | 7/2017 | Ahn et al. | |
| 2017/0308326 A1* | 10/2017 | Yarovoy | G06F 3/0688 |
| 2018/0113615 A1* | 4/2018 | Park | G06F 3/061 |
| 2018/0275921 A1* | 9/2018 | Katagiri | G06F 3/0604 |
| 2018/0285073 A1* | 10/2018 | Fukuchi | G06F 3/0659 |
| 2018/0314421 A1* | 11/2018 | Linkovsky | G06F 3/0659 |
| 2018/0321987 A1* | 11/2018 | Benisty | G06F 9/528 |
| 2018/0349026 A1* | 12/2018 | Richter | G06F 3/0659 |
| 2019/0250848 A1* | 8/2019 | Benisty | G06F 3/0659 |
| 2019/0278523 A1* | 9/2019 | Benisty | G06F 3/0629 |
| 2019/0317696 A1* | 10/2019 | Jagadish | G06F 3/0617 |
| 2019/0377593 A1* | 12/2019 | Ni | G06F 9/544 |
| 2020/0089404 A1* | 3/2020 | Richter | G06F 13/1668 |
| 2020/0097422 A1* | 3/2020 | Benisty | G06F 3/0679 |
| 2020/0104056 A1* | 4/2020 | Benisty | G06F 3/0679 |
| 2020/0117623 A1* | 4/2020 | Han | G06F 3/0673 |
| 2020/0133896 A1* | 4/2020 | Marks | G06F 13/4221 |
| 2020/0159680 A1* | 5/2020 | Soe | G06F 9/505 |
| 2020/0174819 A1* | 6/2020 | Dong | G06F 9/45558 |

\* cited by examiner

STORAGE SYSTEM AND METHOD FOR EARLY HOST COMMAND FETCHING IN A LOW QUEUE DEPTH ENVIRONMENT

BACKGROUND

NVM Express (NVMe) is a standard for accessing non-volatile storage media attached via a PCI Express (PCIe) bus. NVMe may be used with a variety of non-volatile storage media, such as solid state drives (SSDs). One focus of NVMe relates to input/output communication between a host device (which may access and/or write to the non-volatile storage media) and a storage system (which includes the non-volatile storage media). In that regard, NVMe implements a paired submission queue and completion queue mechanism, with host software on the host device placing commands into the submission queue. Completions are placed onto the associated completion queue by the storage system controller.

DETAILED DESCRIPTION

Overview

Figure 1A:
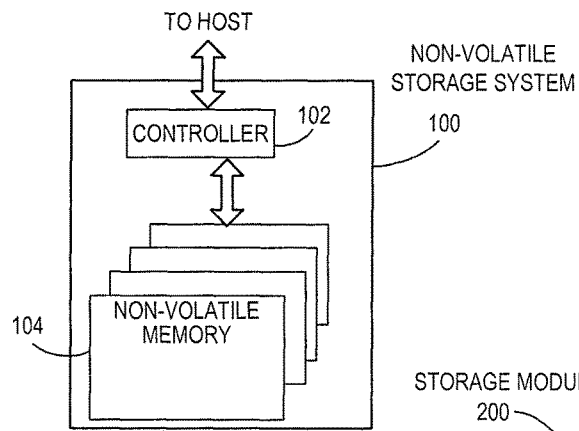
FIG. 1A is a block diagram of a non-volatile storage system of an embodiment.

By way of introduction, the below embodiments relate to a storage system and method for early host command fetching in a low queue depth environment. In one embodiment, a storage system is provided comprising a memory and a controller. The controller is configured to: determine a host's behavior for updating a submission queue; begin executing at least one command based on the determined host's behavior before receiving notification from the host that the host has updated the submission queue; receive notification from the host that the host has updated the submission queue; determine whether the submission queue has been updated with the at least one command that the controller began executing; and in response to determining that the submission queue has been updated with the at least one command that the controller began executing, continue executing the at least one command.

In some embodiments, the controller is further configured to: in response to determining that the submission queue has not been updated with the at least one command, cancel execution of the at least one command and execute a new command from the submission queue.

In some embodiments, the controller is further configured to determine the host's behavior in response to determining that the storage system has a low queue depth.

In some embodiments, the controller is further configured to determine the host's behavior by comparing entries in the submission queue before and after receiving notification from the host that the host has updated the submission queue to learn when and how the host updates the submission queue.

In some embodiments, the determined host's behavior is that the host writes a command to the submission queue only after receiving a completion queue message to a previous command, and wherein the controller is further configured to poll a next slot in the submission queue until the controller detects that a new command has been posted to the submission queue.

In some embodiments, the determined host's behavior is that the host writes a command to the submission queue only at an initialization phase of the submission queue, and wherein the controller is further configured to read the at least one command from the storage system's memory.

In some embodiments, the determined host's behavior is that the host writes N number of commands to the submission queue and sends N number of notifications to the storage system, and wherein the controller is further configured to read the N number of commands from the submission queue before receiving notification from the host that the host has updated the submission queue.

In some embodiments, the memory comprises a three-dimensional memory.

In some embodiments, the storage system is embedded in the host.

In some embodiments, the storage system is removably connected to the host.

In another embodiment, a method for speculative execution of a command is presented that is performed in a storage system. The method comprises: beginning execution of a command stored in a submission queue, wherein the command is selected from the submission queue before the storage system receives notification that the command has been posted in the submission queue, wherein the command is selected based on learned knowledge of how a host updates the submission queue; after receiving a notification from the host that a new command has been posted to the submission queue, determining whether the new command is the command being executed; and in response to determining that the new command is the command being executed, continuing execution of the command; otherwise, executing the new command.

In some embodiments, the learned knowledge is obtained by comparing entries in the submission queue before and after receiving notification from the host that the host has updated the submission queue to learn when and how the host updates the submission queue.

In some embodiments, the learned knowledge is that the host writes a command to the submission queue only after receiving a completion queue message to a previous command, and wherein the method further comprises polling a next slot in the submission queue until detecting that the new command has been posted to the submission queue.

In some embodiments, the learned knowledge is that the host writes a command to the submission queue only at an initialization phase of the submission queue, and wherein the method further comprises selecting the command from the storage system's memory.

In some embodiments, the learned knowledge is that the host writes N number of commands to the submission queue and sends N number of notifications to the storage system, and wherein the method further comprises reading N number of commands from the submission queue before receiving notification from the host that the host has updated the submission queue.

In another embodiment, a storage system is presented comprising: means for beginning execution of a command stored in a submission queue, wherein the command is selected from the submission queue before the storage system receives notification that the command has been posted in the submission queue, wherein the command is selected based on learned behavior of a host; and means for after receiving a notification from the host that a new command has been posted to the submission queue, determining whether the new command is the command being executed.

In some embodiments, the behavior is learned by comparing entries in the submission queue before and after receiving notification from the host that the host has updated the submission queue to learn when and how the host updates the submission queue.

In some embodiments, the learned behavior is that the host writes a command to the submission queue only after receiving a completion queue message to a previous command, and wherein the storage system further comprises means for polling a next slot in the submission queue until detecting that the new command has been posted to the submission queue.

In some embodiments, the learned behavior is that the host writes a command to the submission queue only at an initialization phase of the submission queue, and wherein the storage system further comprises means for selecting the command from the storage system's memory.

In some embodiments, the learned behavior is that the host writes N number of commands to the submission queue and sends N number of notifications to the storage system, and wherein the storage system further comprises means for reading N number of commands from the submission queue before receiving notification from the host that the host has updated the submission queue.

Other embodiments are possible, and each of the embodiments can be used alone or together in combination. Accordingly, various embodiments will now be described with reference to the attached drawings.

Embodiments

Figure 1B:
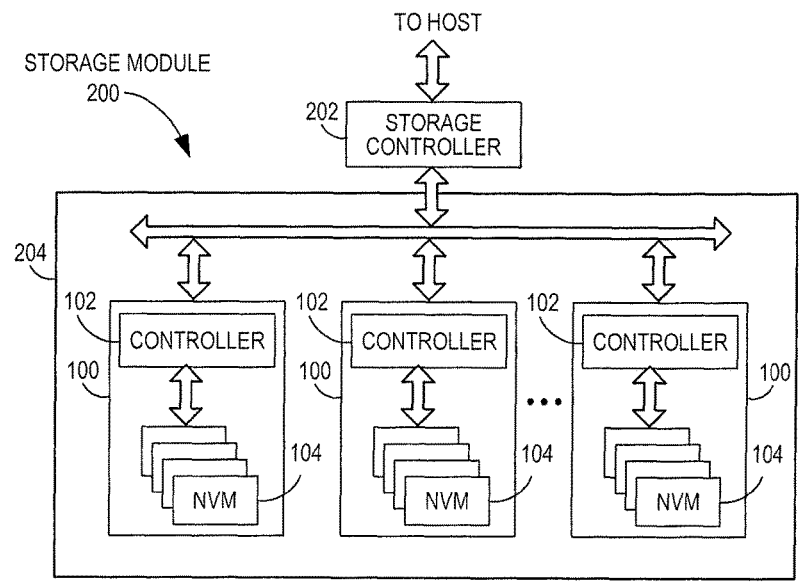
FIG. 1B is a block diagram illustrating a storage module of an embodiment.
Figure 1C:
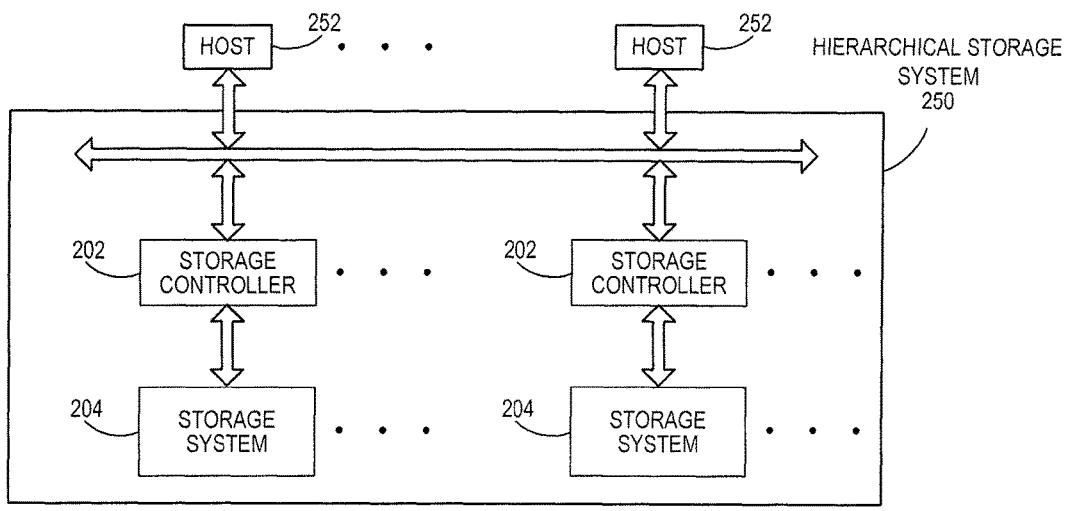
FIG. 1C is a block diagram illustrating a hierarchical storage system of an embodiment.

Storage systems suitable for use in implementing aspects of these embodiments are shown in FIGS. 1A-1C. FIG. 1A is a block diagram illustrating a non-volatile storage system 100 according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interface express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
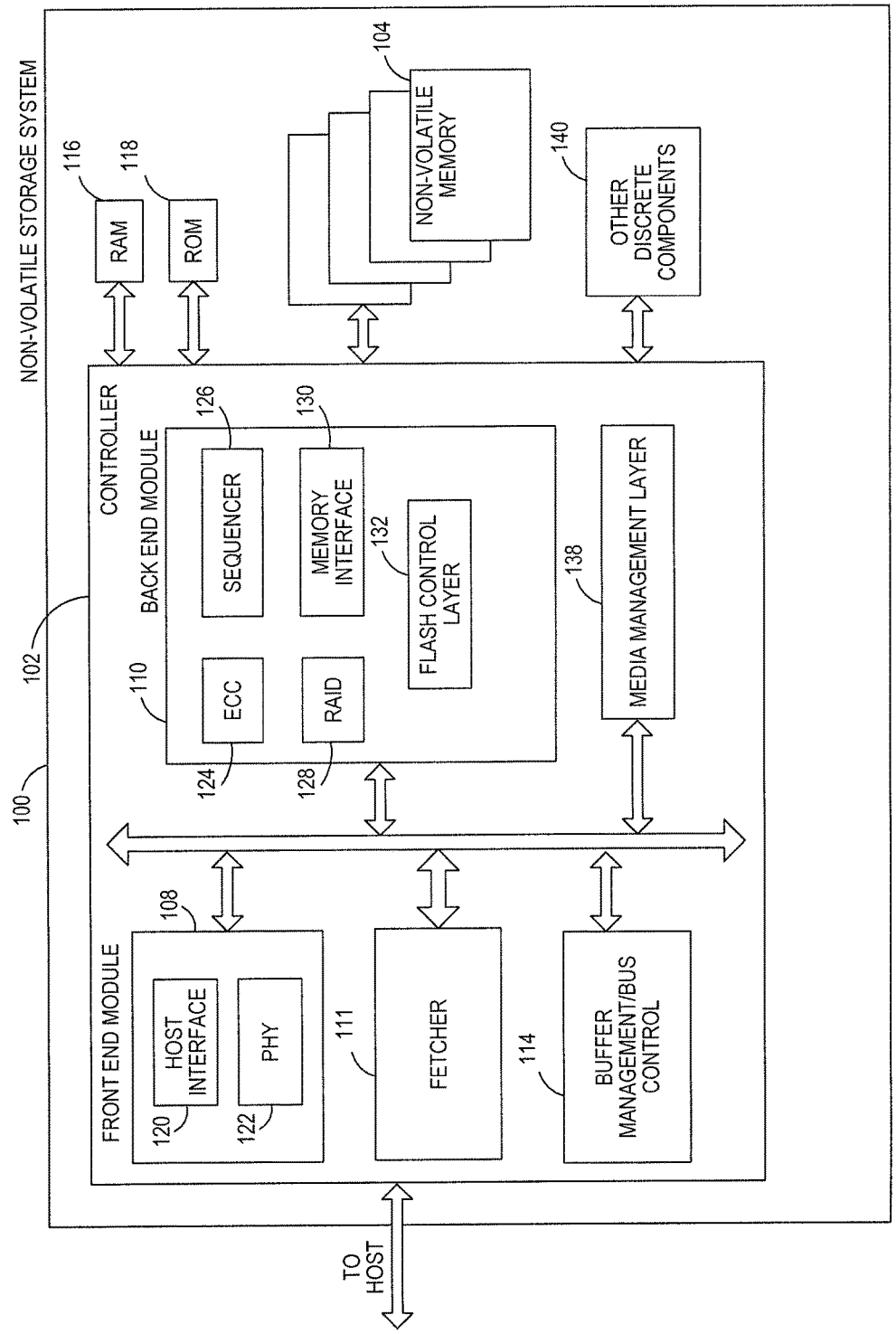
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. Modules of the controller 102 may include a command fetcher 111, which is discussed in more detail below, and can be implemented in hardware or software/firmware. The command fetcher 111 can be configured to perform the algorithms and methods discussed below and shown in the attached drawings.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
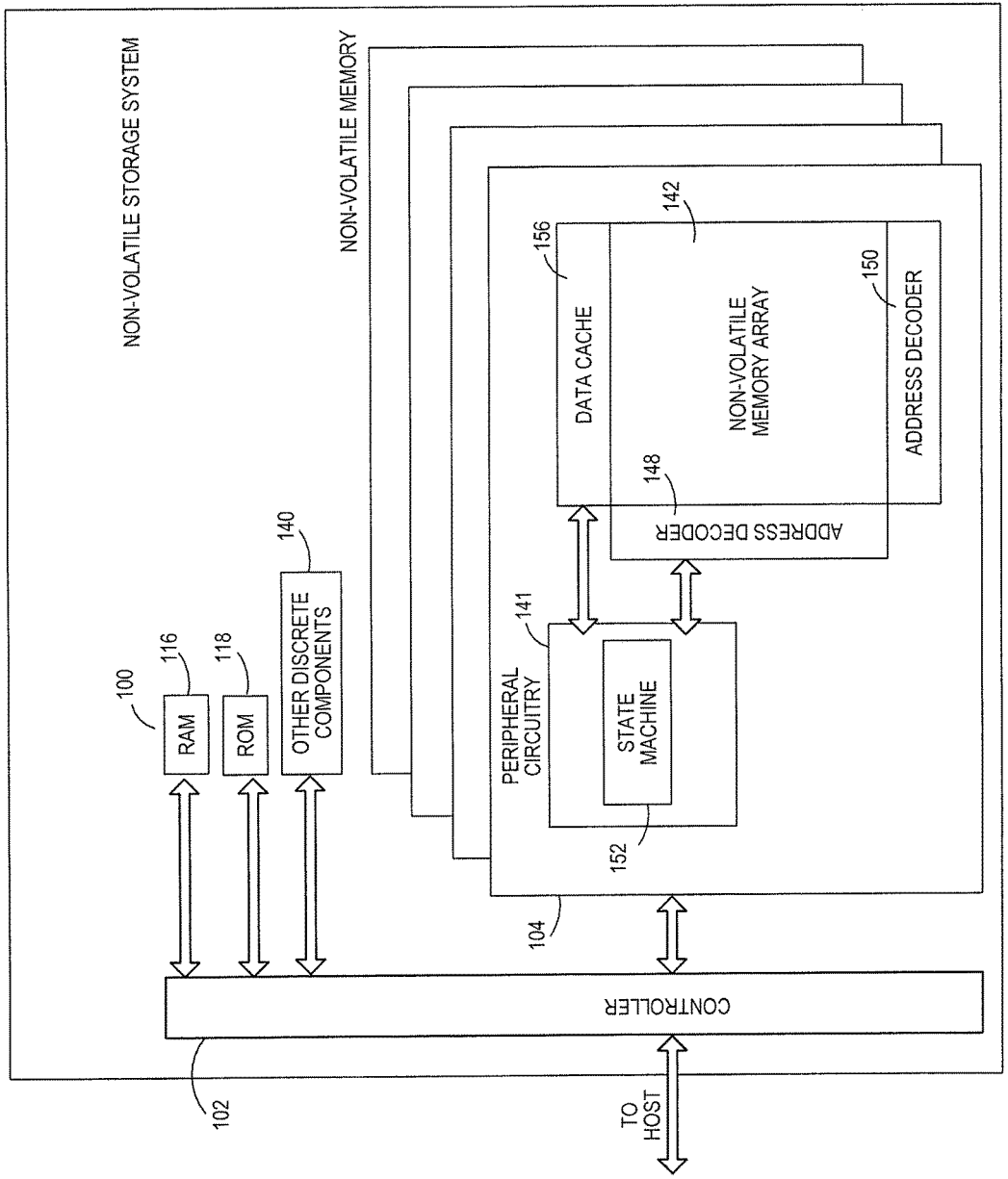
FIG. 2B is a block diagram illustrating components of the non-volatile memory storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Figure 3A:
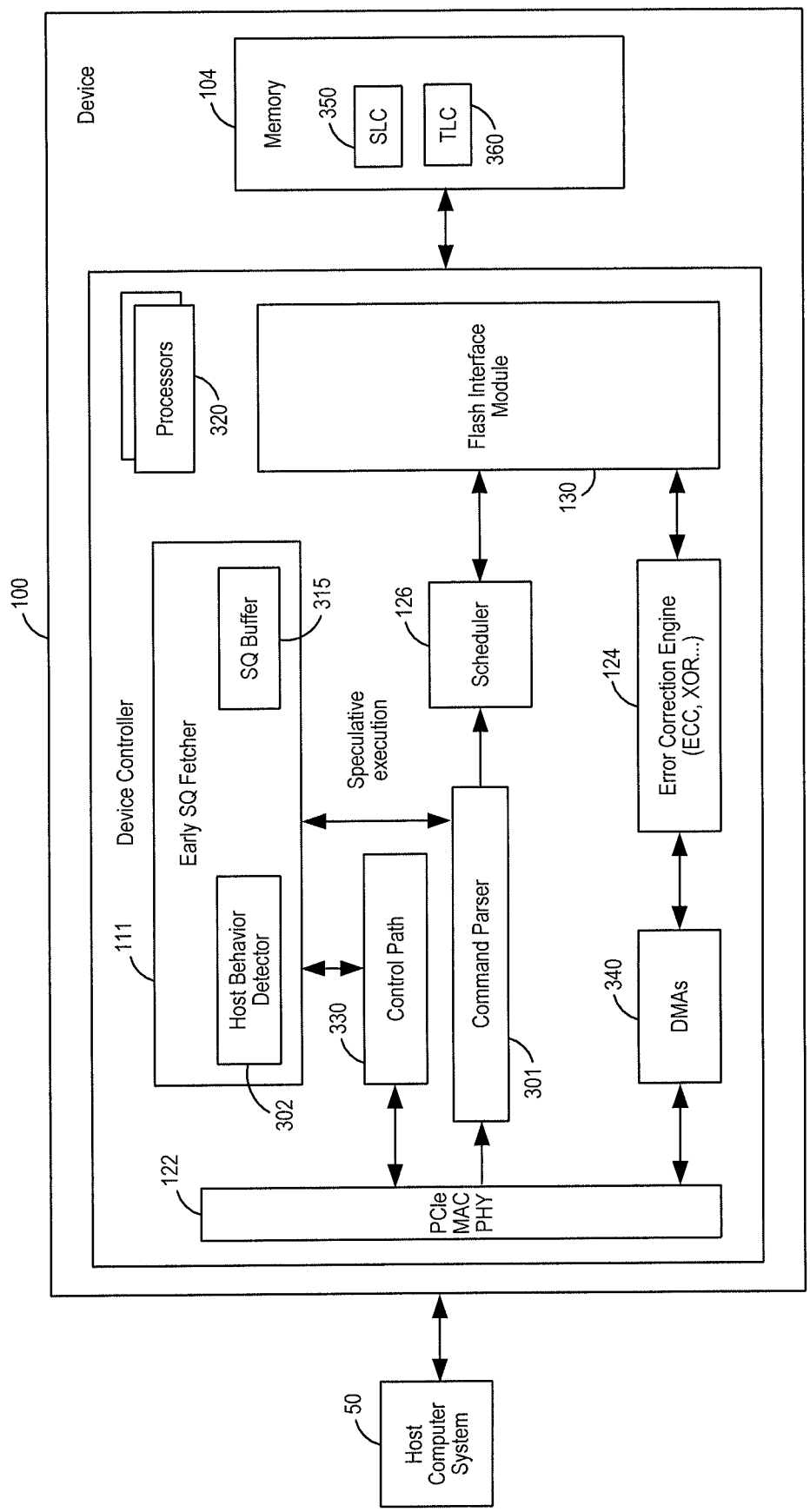
FIG. 3A is a block diagram illustrating a host and storage system of an embodiment.

FIG. 3A is an illustration of one particular implementation of a host device 50 and storage system 100 of an embodiment. It should be noted that this is just an example, and other implementations can be used. For example, while FIG. 3A shows some components that are similar to those shown in FIG. 2A and also shows some additional components, other implementations of the controller 102 can be used.

The host 50 can take any suitable form, such as, but not limited to, a personal computer, a mainframe computer, a server, or other computing device. The host 50 communicates with the storage system 100 using one or more busses. The bus communicates between a storage system interface (not shown) in the host 50 and the PCIe MAC PHY 122 in the controller 102 of the storage system 100. "PHY" is an abbreviation for the physical layer and refers to the circuitry used to implement physical layer functions. The PHY can connect a link layer device called a MAC (media access control) to a physical medium, such as a wire, cable, or fiber. There are many protocols defined in the industry for this interface, such as, but not limited to, Peripheral Component Interconnect Express (PCIe), SATA, and NVMe. The MAC and PHY 122 can implement three low protocol layers (Transaction layer, Data Link layer, and Physical layer).

While the MAC PHY 122 is the interface between the controller 102 and the host 50, the flash interface module 130 is the interface between the controller 102 and the memory arrays 104. In general, the flash interface module (FIM) 130 is responsible for low-level interaction with the memory 104, which can include, for example, single level memory cells (SLC) 350 and/or triple level memory cells (TLC) 360. While flash is used in this example, it should be noted that other memory technologies can be used, which is why FIG. 2A refers to a "memory interface" 130 instead of the more specific "flash interface module."

As shown in FIG. 3A, there are several components between the MAC PHY 122 and the flash interface module 130. In this embodiment, those components include a command parser 301, an early submission queue (SQ) fetcher 111 (which includes a host behavior detector 302 and an SQ buffer 315), processors 320, a control path 330, direct memory access modules (DMAs) 340, an error correction module 124, and a scheduler/sequencer 126. Again, this is just an example implementation, and other implementations can be used. Component(s) in the controller 102 can form a command processing path. As used herein, a "command processing path" can refer to one or more components in the controller 102 that are used to process a command, and a pipeline stage can refer to one of these components.

The command parser 301 is responsible for fetching and parsing the commands from the host 50 and internally queuing them. For example, the command parser 301 can receive a command, parses it, and check the correctness of the command. The command parser 301 can also be responsible for controlling the flow of data between the controller 102 and the memory 104 by ordering requests or commands in a queue. The order may be based on priority of the request, availability of resources to handle the request, an address needed for the request, the age of the request, or access history of the requestor. In this way, the queue can be used to enable the delay of command execution, either in order of priority, on a first-in first-out basis, or in any other order. Instead of waiting for each command to be executed before sending the next one, the command parser 301 can just put the commands in the queue and can perform other processes while the queue is executed. In operation, the command parser 301 gets commands from the host 50, makes sure the command is ok, and can classify the command as a read or write command. The command parser 301 can also determine whether the command should be executed by the command executor 302 or by the processors 320. The command executor 302 is a hardware component in this embodiment and is used as a hardware accelerator for certain commands (e.g., user reads and writes to the memory 104). However, other commands (e.g., administrative commands) may not be suitable for hardware acceleration and are sent instead to the processors 320 for execution.

The scheduler 126 is responsible for scheduling data transfers and control paths. For example, read data might arrive from different memory arrays in parallel. The scheduler 126 can arbitrate between them and activate the DMAs 340, which are responsible for the data transfer between the host 50 and memory 104. As will be discussed below, the scheduler 126 can also be responsible for controlling the data transfer while activating the control path for fetching physical region pages (PRPs), posting completion and interrupts, and activating the DMAs 340 for the actual data transfer between the host 50 and the storage device 100. The error correction module 124 is responsible for error detection and correction and can decode and encode data read from and written to the memory 104. In general, the early SQ fetcher 111 is responsible for fetching commands from the host 50 before getting any notification from host 50.

The storage system (sometimes referred to herein as the storage device or device) 100 can be used with any suitable protocol or specification. One such specification is the Non-Volatile Memory Express (NVMe) specification. NVMe is based on a paired submission queue (SQ) and completion queue (CQ). The host device 50, using host software, places commands into a respective submission queue. The memory device 100, via the memory device controller 102, places entries on the associated completion queue, with the entries indicative of completed execution of commands.

Figure 3B:
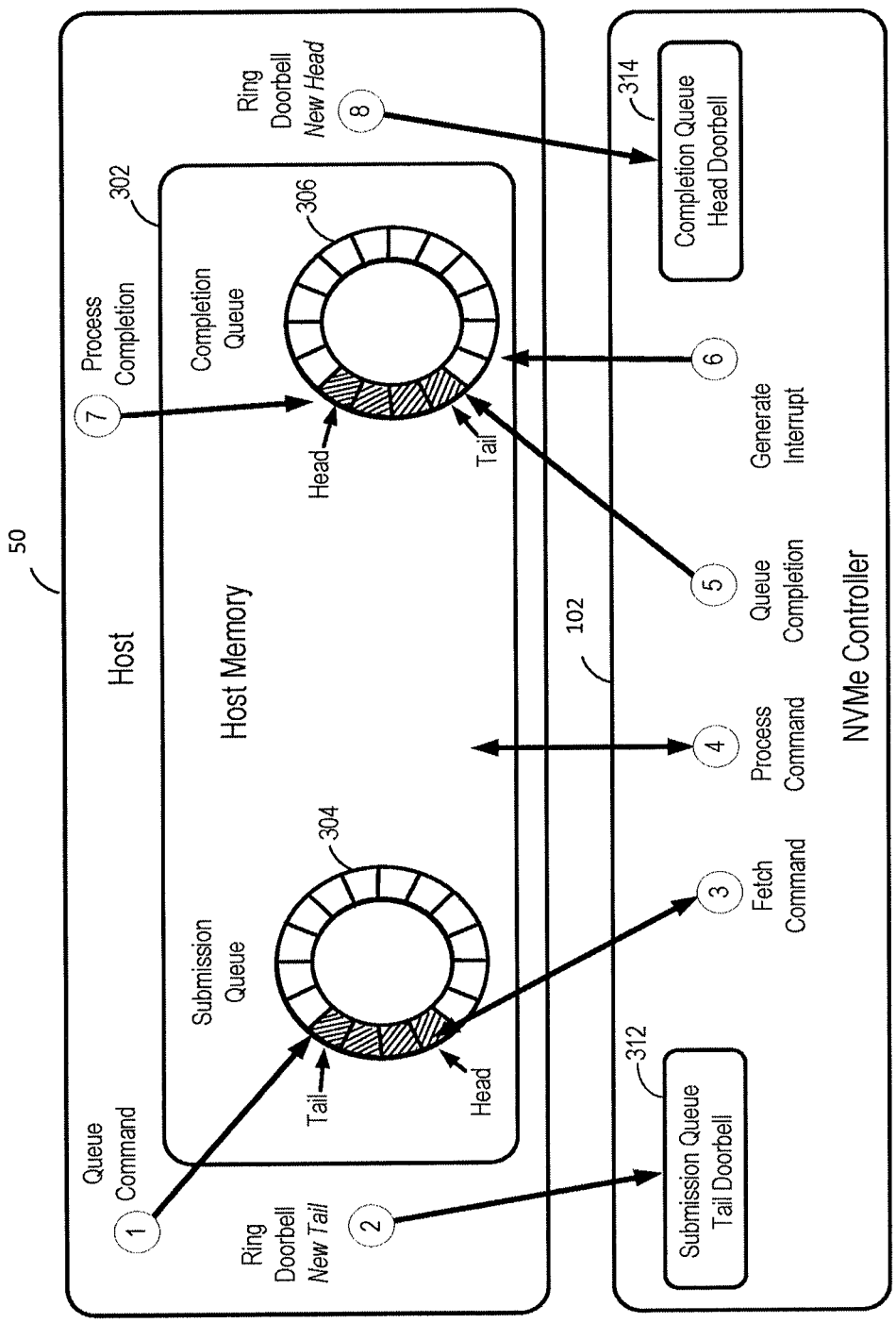
FIG. 3B is a block diagram illustrating a host and storage system of an embodiment and shows a sequence for requesting and processing a command.

FIG. 3B is a block diagram illustrating a host 50 and storage system 100 of an embodiment and shows a sequence for the host 50 and storage device 100 to request and process a command in NVMe. As shown in FIG. 3B, the host device 50 includes host memory 302, and the memory device 100 includes a controller, such as an NVMe controller 102. In one implementation, the host memory 302 includes a submission queue 304 and a completion queue 306. In practice, at the initialization phase, the host device 50 creates one or more submission queues and one or more corresponding completion queues. In one implementation, the submission queues and completion queues may have a 1:1 correlation, and in another implementation, the submission queues and completion queues do not have a 1:1 correlation.

For initialization, the host device 50 may notify the memory device 100 of the submission queue(s) and completion queue(s) by sending information, such as the base address for each queue to the memory device 100. In that regard, each submission queue has a corresponding completion queue. When the submission queue and the completion queue are resident in the host device 50, the host device 50 sends information to the memory device 100 in order for the memory device 100 to determine the locations of the submission queue and the completion queue in the host device 50. In a specific implementation, the host device 50 sends a command indicating the creation of the submission queue and the completion queue. The command may include a physical region pages (PRP)1 pointer, which is a pointer to a list on the host device 50 of the locations of the specific submission queue or the specific completion queue. In practice, the memory device 100 sends a transport layer packets (TLP) read request using the PRP1 in order to obtain the PRP list, and stores the PRP list in the memory device 100 to determine the memory locations within the host device 50 for use in future commands to read from the specific submission queue or write to the specific completion queue. Alternatively, the host device 50 may instruct the memory device 100 to create the submission queue(s) and corresponding completion queue(s) in a memory resident in the memory device 100, such as a controller memory buffer.

The submission queue 304 may be based on a ring buffer, such as shown in FIG. 3B, with a head pointer and a tail pointer. After creating the submission queue(s) and notifying the memory device 100 about the created submission queue (s), the host device 50 may write a command (or several commands) to the submission queue. This is indicated in FIG. 3B as step 1, labeled "Queue Command." In particular, FIG. 3B illustrates that four commands were written to the submission queue. In one implementation, the memory device 100 is unaware that the host device 50 has updated the submission queue 304 with four commands, since the host device 50 updated its own host memory 302. In another implementation (such as when the submission queue(s) and completion queue(s) are resident in the controller memory buffer), the memory device 100 may monitor a communication interface between the host device 50 and the memory device 100 for particular communications, such as writing to the submission queue(s) resident on the memory device 100. For example, the memory device 100 can monitor the transport layer packets (TLPs) on the PCI Express bus to determine whether the host device 50 has sent a TLP that results in an update to the submission queue resident in the controller memory buffer. In that regard, the memory device may identify one or more entries being written to the submission queue(s).

In step 2, the host device 50 writes to a submission queue tail doorbell register 312 in the memory device 100. This writing to the submission queue tail doorbell register 312 signifies to the memory device 100 that the host device 50 queued one or more commands in this specific submission queue 304 (e.g., 4 commands as illustrated in FIG. 3B). The writing to the submission queue tail doorbell register 312 may take one of several forms. In one way, the host device 50 indicates a new tail for the submission queue 304, thereby indicating the number of commands written to the submission queue 304. Thus, since the memory device 100 is aware of the base address for the submission queue 304, the memory device 100 only needs to know the tail address to indicate the number of new commands written to the submission queue 304. After a command (or a set of commands) is processed, the memory device 100 then sets the new head of the submission queue 304 accordingly. So that, the tail pointer may represent an "offset" from the head pointer. In another way, the host device 50 indicates a number of commands written to the submission queue 304. In practice, each submission queue 304 has a corresponding submission queue tail doorbell register in the memory device 100, so that when the host device 50 updates a particular doorbell register (correlated to a particular submission queue 304), the memory device 100 can determine, based on the doorbell register, which particular submission queue 304 has been updated.

After step 2 (whereby the memory device 100 is notified of command(s) on the submission queue 304) and before step 3 (whereby the memory device 100 fetches the command(s)), the memory device 100 is aware that there are command(s) pending in the submission queue 304. In the general case, there may be several submission queues (with potentially many pending commands in the several submission queues). Thus, before performing step 3, the memory device controller 102 may arbitrate between the various submission queues to select the particular submission queue from which to fetch the command(s).

Responsive to determining which particular submission queue 304 from which to fetch the command(s), at step 3, the memory device 100 fetches the command(s) from the particular submission queue 304. In practice, the memory device 100 may access the base address of the particular submission queue 304 plus the pointer on the current head pointer implemented in the host device 50.

As discussed above, the submission queue or completion queue may be assigned an area of memory (such as in the host device 50 or in the controller memory buffer in the memory device 100). The submission queue and completion queues may include multiple entries, each associated with a specific command. The size of each entry may be a predetermined size, such as 64 Kb. In this regard, entries within the submission queue may be determined using the base address for the submission queue, and by offsetting the base address with the number of entries multiplied by the size of each entry (e.g., 64 Kb).

As discussed above, the memory device 100 is aware of the tail pointer, having been notified via step 2. Thus, the memory device 100 can obtain all of the new commands from the submission queue 304. In a submission queue resident in the host device 50, the memory device 100 may send a TLP request to obtain the command(s) from the submission queue 304. Responsive to receipt of the TLP request, the host device 50 sends a completion TLP message with the commands in the submission queue 304. In this regard, at end of step 3, the memory device 100 receives the command(s) from the submission queue 304.

At step 4, the memory device 100 processes the command. In one implementation, the memory device 100 parses the commands and determines the steps to execute the commands (e.g., read/write/etc.). For example, the command may comprise a read command. Responsive to receipt of the read command, the memory device 100 parses the read command, implements the address translation, and accesses the flash to receive the data. After receiving the data, the memory device 100 causes the data to be stored on the host device 50 based on information in the command (e.g., the PRP 1). As another example, the command may comprise a write command. Responsive to receipt of the write command, the memory device 100 parses the write command, determines the location of the data on the host device 50 subject to the write, reads the data from the location on the host device 50, and writes the data to memory 104.

After completing the data transfer, at step 5, the memory device controller 102 sends a completion message to the relevant completion queue 306. At the initialization phase, the host device 50 associates submission queues with completion queues. So that, the host device 50 is aware of commands that are completed in the submission queue based on which completion queue the memory device 100 writes to. The completion message may contain information as to the processing of the command(s), such as whether the command was completed successfully or whether there was an error when executing the command.

After step 5, the host device 50 is unaware that the memory device 100 posted to the completion queue 306. This is due to the memory device 100 causing data to be written to the completion queue 306. In that regard, at step 6, the memory device 100 notifies the host device 50 that there has been an update to the completion queue 306. In particular, the memory device 100 posts an interrupt to the host device 50.

Responsive to receiving the interrupt, the host device 50 determines that there are one or more completion entries pending for the host device 50 in this completion queue 306. At step 7, the host device 50 then processes the entries in the completion queue 306.

After the host device 50 processes the entries from the completion queue 306, at step 8, the host device 50 notifies the memory device 100 of the entries that the host device 50 processed from the completion queue 306. This may be performed by updating a completion queue head doorbell register 314 indicative to the memory device 100 that the host device 50 processed one or more entries from the completion queue 306. Responsive to updating the completion queue head doorbell register 314, the memory device 100 updates the head of the completion queue 306. Given the new head, the memory device 100 is aware as to which entries in the completion queue 306 have already been processed by the host device 50 and may be overwritten.

In one implementation, the memory device controller 102 begins to process a command prior to notification by the host device 50 of the command on the submission queue (e.g., prior to notification via the submission queue tail doorbell register). For example, the memory device 100 may determine whether the host device 50 has written a command to the submission queue. This may be performed in one of several ways. In one way, the memory device 100 may monitor the NVMe submission queues, thereby enabling the memory device to begin speculative execution of the commands even before receiving the corresponding notification from the host device 50 (e.g., the doorbell write transactions). In another way, the memory device 100 may monitor a communication interface between the host device 50 and the memory device 100 (e.g., the ingress of the PCIe bus) to determine whether the host device 50 has sent any communications indicative of writing a command to a submission queue.

In response to the memory device 100 determining that the host device 50 has written command(s) to the submission queue(s), the memory device 100 may parse the command(s), and responsive to determining that one or more new commands are on the submission queue, may begin the execution of the one or more new commands in a speculative manner.

Various commands may be subject to speculative execution. For instance, a read command may be subject to speculative read command execution, triggering a Read Look Ahead (RLA) algorithm. In particular, the relevant data subject to the read command may be fetched from the memory 104 to a temporal buffer. When the host device 50 notifies the memory device 100 of the command (e.g., queues the relevant command in by issuing a write transaction to the corresponding submission queue doorbell register), the data may be fetched immediately from the temporal buffer and provided to the host device 50. In this regard, the RLA hit may result in better memory latency (e.g., sense and transfer time) and thereby result in better performance. As another instance, a write command may be subject to speculative write command execution. For example, one or more steps for performing the write command, such as fetching the flash translation layer (FTL) table, may be performed prior to the host device 50 queuing the command. Thus, the overall performance of the memory device 100 may be improved.

In one implementation, the memory device 100 selectively performs speculative execution of commands. In a first specific implementation, the memory device 100 may analyze the command, and based on the type of command, may determine whether to speculatively begin execution of the command prior to notification of the host device 50, via the doorbell register, of placement of the command on the submission queue. As discussed herein, there are different types of commands, such as read commands, write commands, and the like. In NVMe, the read command includes a pointer to a physical region page (PRP) list, with the PRP list indicating the sections in host memory where the memory device is to write the data that was read from memory 104. Likewise, the write command includes a pointer to a PRP list that indicates the sections in host memory where the data to write to memory is located (i.e., the memory device 100 uses the PRP list to read host memory locations for data, with the read data being written to memory 104). In a second specific implementation, the memory device 100 may analyze at least one aspect of the command, such as the priority of the command, may determine whether (or when) to speculatively begin execution of the command prior to notification of the host device 50, via the doorbell register, of placement of the command on the submission queue.

Further information about these and other NVMe related operations can be found in U.S. patent application Ser. No. 15/585,827, which is hereby incorporated by reference.

Queue Depth (QD) is a parameter that defines the number of outstanding host commands queued in the device controller 102 before getting any completion message. The higher the queue depth, the better device performance. Low QD performance results are important since they affect storage device benchmarking. Specifically, QD1 is a scenario that only one outstanding command exists in the device. Performance results in this scenario represent the latency of the storage device for completing a single command. When the host 50 configures the storage device controller 102 to operate with low queue depth (QD), the random read (RR) performance is very low compared to high queue depth.

Figure 4:
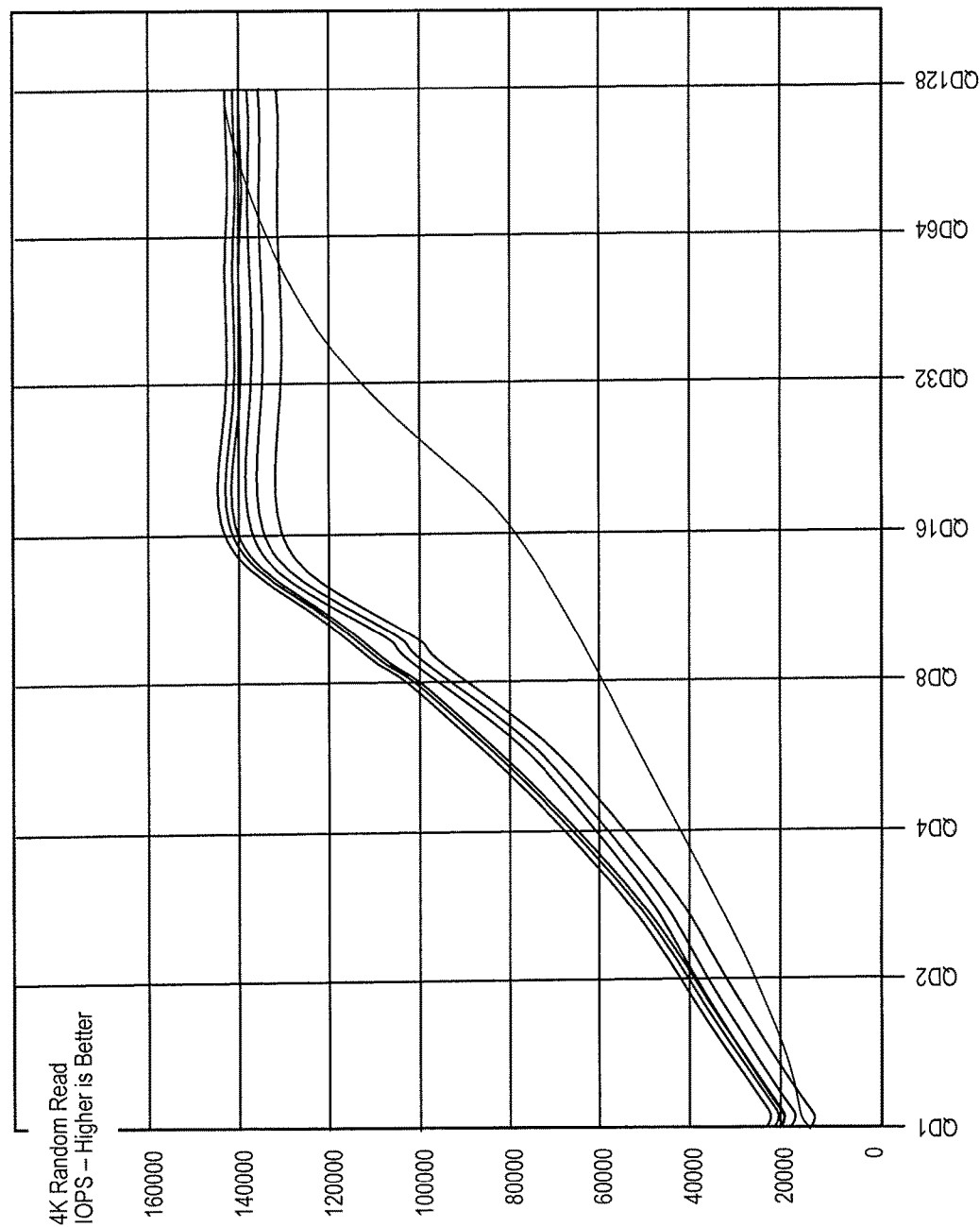
FIG. 4 is a graph of an embodiment illustrating performance as a function of queue depth.

Turning again to the drawings, FIG. 4 is a graph of an embodiment illustrating performance as a function of queue depth. More specifically, FIG. 4 depicts the RR performance as a function of configured QD. According to FIG. 4, the RR performance is very low when QD is configured to 1. For example, the RR(QD1) in one type of storage device controller is 12,076 input/output operations per second (IOPS) (82.8 microseconds from doorbell until the host 50 receives a completion). Therefore, it is desired to increase the performance in low QD scenarios, as good RR performance is a desirable parameter. The following embodiments can be used to address performance issues in storage devices that have in RR low QD scenarios and increase performance results.

Several methods can be used to increase storage device performance in low queue depth scenarios. For example, pipeline stages can be bypassed in case of low queue depth in order to have shorter latency and better performance. In this method, the storage device 100 may start command execution speculatively and wait for the results of the bypassed machines before transferring anything to the host 50. In another method, a read-look-ahead algorithm can be used to predict the next address that the host 50 is going to access.

Another method, which will be discussed in more detail below, takes advantage of an aspect of the NVMe standard that provides the storage device 100 the capability to access the command slots in the host memory. This method can be used alone or in combination with other methods, such as the two mentioned above, which may improve performance even more.

In one embodiment, the storage device 100 pre-fetches a host command from the host submission queue even before the storage device 100 has been notified about this pending command. The storage device controller 102 performs several operations that help to increase the probability that it is a new command and not a very old command. When passing this stage, the storage device 100 may execute the command in a speculative way (e.g., sense the data from the memory 104 and store it in an internal buffer). When getting the notification from the host 50 that a valid command is pending in the submission queue, the storage device 100 fetches the command and executes it while taking advantage of the previous speculative execution.

This behavior is more relevant to low queue depth scenarios in which the storage device 100 has spare resources that are not really used due to the low workload. The storage device 100 detects this scenario, learns this specific host queuing mechanism, and uses this information for getting the commands earlier for speculative execution. This approach will introduce a significant boost in random read low queue depth performance.

In one embodiment, the storage device 100 detects that the host 50 operates in a low queue depth mode and that there are unused resources in the storage device 100. In order to improve the performance, the storage device 100 tries to get the command earlier even before getting any notification from the host 50. This is done by learning and understanding the exact host flow for queuing commands in the storage device 100. After detecting the host flow, the storage device 100 takes advantage of that and will get the command even before host notification. Several examples are disclosed below. By getting the command earlier, the storage device 100 may execute it in a speculative way, so when getting the notification, the command can be executed much faster.

In general, when the storage device 100 has unused resources compared to the current workload (e.g., low queue depth), the storage device 100 learns host flow for queuing commands in the device 100. This learning process includes fetching the entire content of the submission queue and re-fetching it again after each doorbell update. This is done in order to understand when the host 50 updates the submission queue and how many slots are updated at once. After this learning process, the storage device 100 fetches the commands from the host 50 even before getting the queuing notification, as will be explained below. The storage device 100 may then execute the command in a speculative manner. When getting the doorbell, the storage device 100 fetches the command from the host 50 and compares its content to the speculatively-executed command. If they are the same, the storage device 100 executes the command while taking advantage of the speculative execution.

Figure 5:
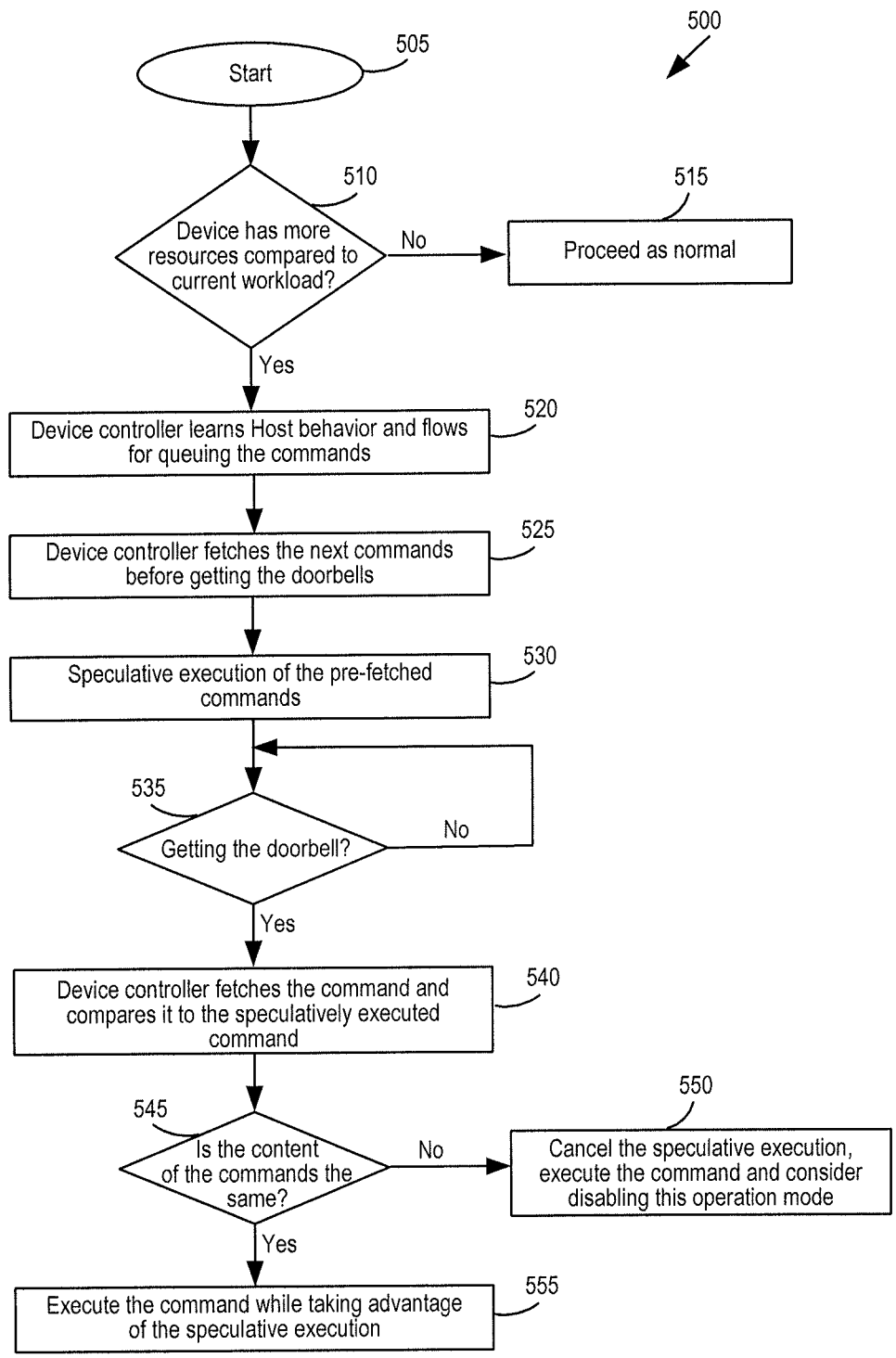
FIG. 5 is a flow chart of a method of an embodiment for early host command fetching in a low queue depth environment.

This method is illustrated in the flow chart 500 of FIG. 5. As shown in FIG. 5, when the method starts (act 505), the storage device 100 determines if it has more resources compared to the current workload (act 510). If it does not, the storage device 100 proceeds as normal (act 515). If it does, the storage device controller 102 learns the host behavior and flows for queuing the commands (act 520). Next, the storage device controller 102 fetches the next commands before getting the doorbells (act 525). Following this, the storage device controller 102 speculatively executes the pre-fetched commands (act 530). The storage device 100 then determines if it is getting the doorbell (act 535). If it is, the storage device controller 102 fetches the command and compares it to the speculatively executed command (act 540). The storage device 100 then determines if the content of the commands is the same (act 545). If the content is not the same, the storage device cancels the speculative execution, executes the command, and considers disabling this operating mode (act 550). If the content is the same, the storage device executes the command while taking advantage of the speculative execution (act 555).

The following paragraphs describe several host learned behaviors. The storage device 100 of this embodiment is able to identify them and act accordingly while implementing an adapted solution for each host behavior.

In one host behavior, the host 50 writes a command to the submission queue only after receiving the completion queue message to the previous command. Then, the host 50 notifies the storage device 100 about this new pending command by writing the doorbell message. Next, the host 50 waits for the completion queue entry and only then is the next command written. In this host behavior, the new command is exposed to the storage device 100 just before the doorbell write, and usually this is a short time. In this embodiment, the storage device 100 learns this host behavior and acts accordingly. After posting the completion message to a command, the storage device 100 implements a polling operation on the next slot of the submission queue, even when the queue is empty. The storage device 100 compares the content of each fetched command to the previous command held in this slot. The polling operation continues until detecting a difference and then the new command will start the speculative execution. When getting the doorbell, the storage device 100 makes sure that the speculatively executed command is really the same as the command stored in the submission queue (after the doorbell). If it is indeed the same, the command is executed while taking advantage of the speculative operation. Otherwise, the speculative operation is cancelled and the new command is executed.

Figure 6:
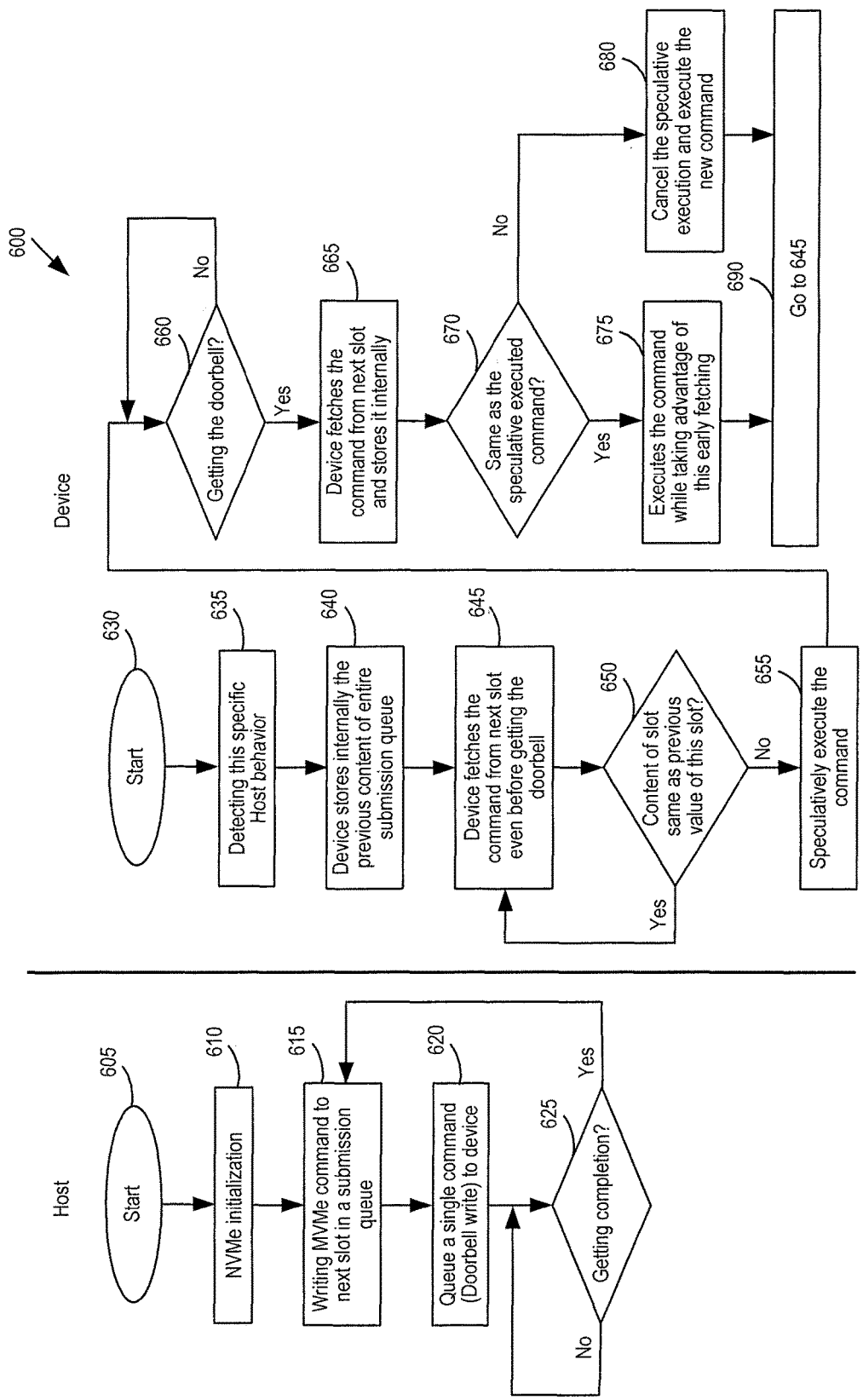
FIG. 6 is a flow chart of a method of an embodiment in which a host writes a command to a submission queue only after receiving a completion queue message to a previous command.

This host behavior in which the host 50 writes a command to a submission queue only after receiving a completion queue message to a previous command is illustrated in the flow chart 600 of FIG. 6. As shown in FIG. 6, when the method starts (act 605), the host 50 performs NVMe initialization (act 610). The host 50 then writes the NVMe command to the next slot in a submission queue (act 615). The host 50 next queues a single command (doorbell write) to the storage device 100 (act 620). The host 50 then determines if it is getting a completion signal (act 625). If it is, the host 50 proceeds to act 615.

On the storage device 100 side, after the method starts (act 630), the storage device 100 detects this specific host behavior (act 635) and stores internally the previous content of the entire submission queue (act 640). The device 100 then fetches the command from the next slot even before getting the doorbell (act 645). Next, the storage device 100 determines if the content of the slot is the same as the previous value of the slot (act 650). If it is, the device 100 proceeds to act 645. If it is not, the device 100 speculatively executes the command (act 655), after which it determines if it is getting the doorbell (act 660). If it gets the doorbell, the device 100 fetches the command from the next slot and stores it internally (act 665). The device 100 then determines if the fetched command is the same as the speculatively executed command (act 670). If it is, the device 100 executes the command while taking advantage of this early fetching (act 675). If it is not, the device 100 cancels the speculative execution and executes the new command (act 680). In either situation, the device 100 next proceeds to act 645 (act 690).

As another example, the learned knowledge of host behavior is that the host 50 writes the command to the submission queue at the initialization phase only. After receiving the completion queue message to the previous command, the host 50 sends the next doorbell to the storage device 100. In this flow, the same commands are executed by the storage device 100 again and again, but since the depth of the submission queue is very high, the storage device 100 should not have been affected. In this embodiment, the storage device 100 learns this host behavior and acts accordingly. When detecting this behavior, the content of the entire submission queue is stored internally. The storage device 100 fetches the commands from this internal storage and executes them in a speculative way. When getting the doorbell, the command is fetched from the host submission queue while making sure it is the same command as stored internally. If so, the storage device 100 executes the command while taking advantage of the speculative execution.

Figure 7:
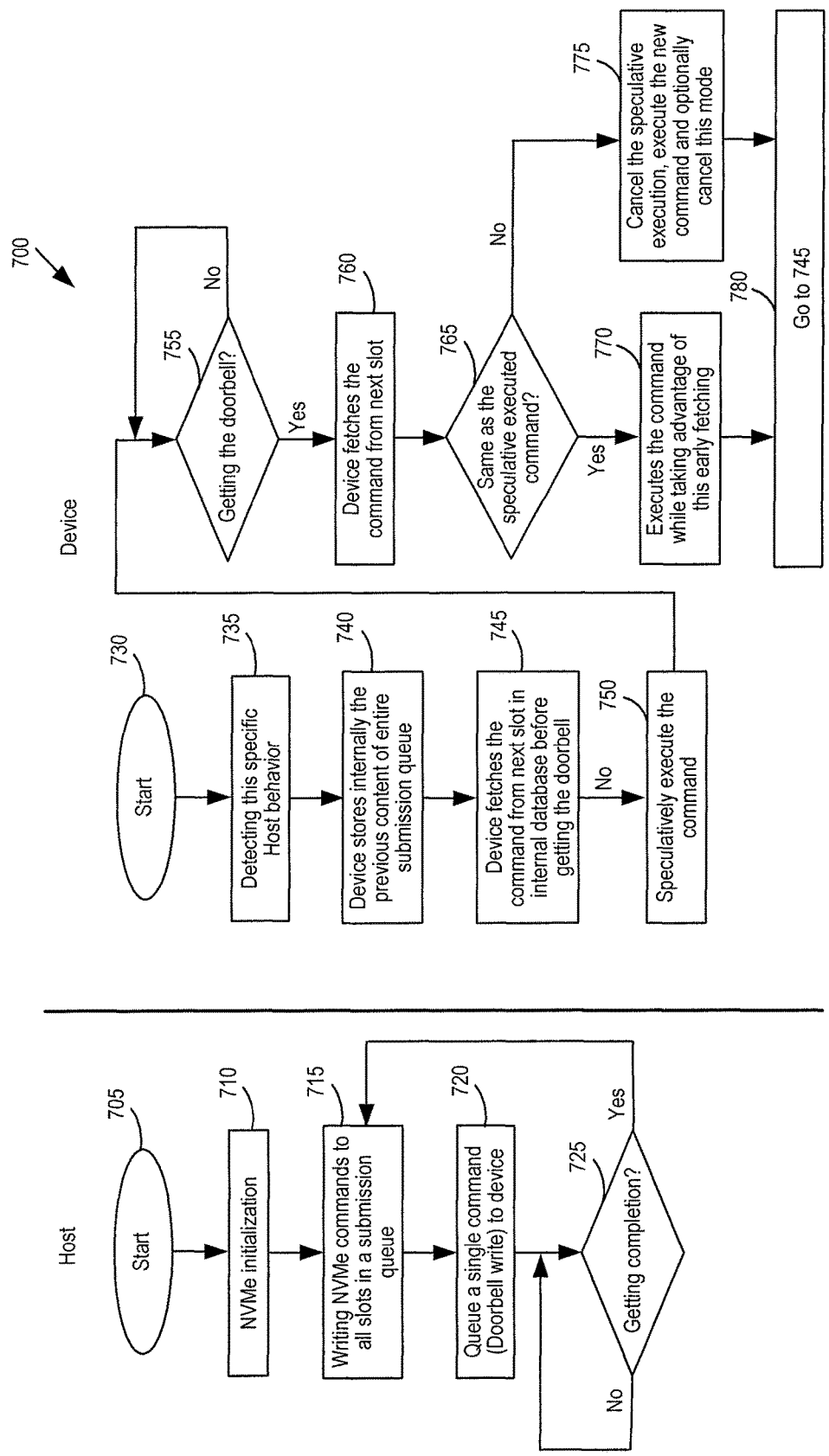
FIG. 7 is a flow chart of a method of an embodiment in which a host writes a command to a submission queue at an initialization phase only.

This scenario is illustrated in the flow chart 700 of FIG. 7. As shown in FIG. 7, when the method starts (act 705), the host 50 performs NVMe initialization (act 710). The host 50 then writes NVMe commands to all slots in a submission queue (act 715). The host 50 next queues a single command (doorbell write) to the storage device 100 (act 720). The host 50 then determines if it is getting a completion signal (act 725). If it is, the host 50 proceeds to act 715.

On the storage device 100 side, after the method starts (act 730), the storage device 100 detects this specific host behavior (act 735) and stores internally the previous content of the entire submission queue (act 740). The device 100 then fetches the command from the next slot in the internal database before getting the doorbell (act 745). The storage device 100 the speculatively executes the command (act 750), after which it determines if it is getting the doorbell (act 755). If it gets the doorbell, the device 100 fetches the command from the next slot (act 760). The device 100 then determines if the fetched command is the same as the speculatively executed command (act 765). If it is, the device 100 executes the command while taking advantage of this early fetching (act 770). If it is not, the device 100 cancels the speculative execution, executes the new command, and optionally cancels this mode (act 775). In either situation, the device 100 next proceeds to act 745 (act 780).

In yet another host behavior, the host 50 updates N next commands in the submission queue and then queues them one by one to the storage device 100. In this embodiment, the storage device 100 learns this host behavior and acts accordingly. After posting the completion message to a command, the storage device 100 fetches the next N commands from the host 50 and executes them in a speculative way. When getting the doorbell, the command is fetched and compared with the speculative executed command. Finally, the storage device 100 executes the command while taking advantage of the speculative execution.

Figure 8:
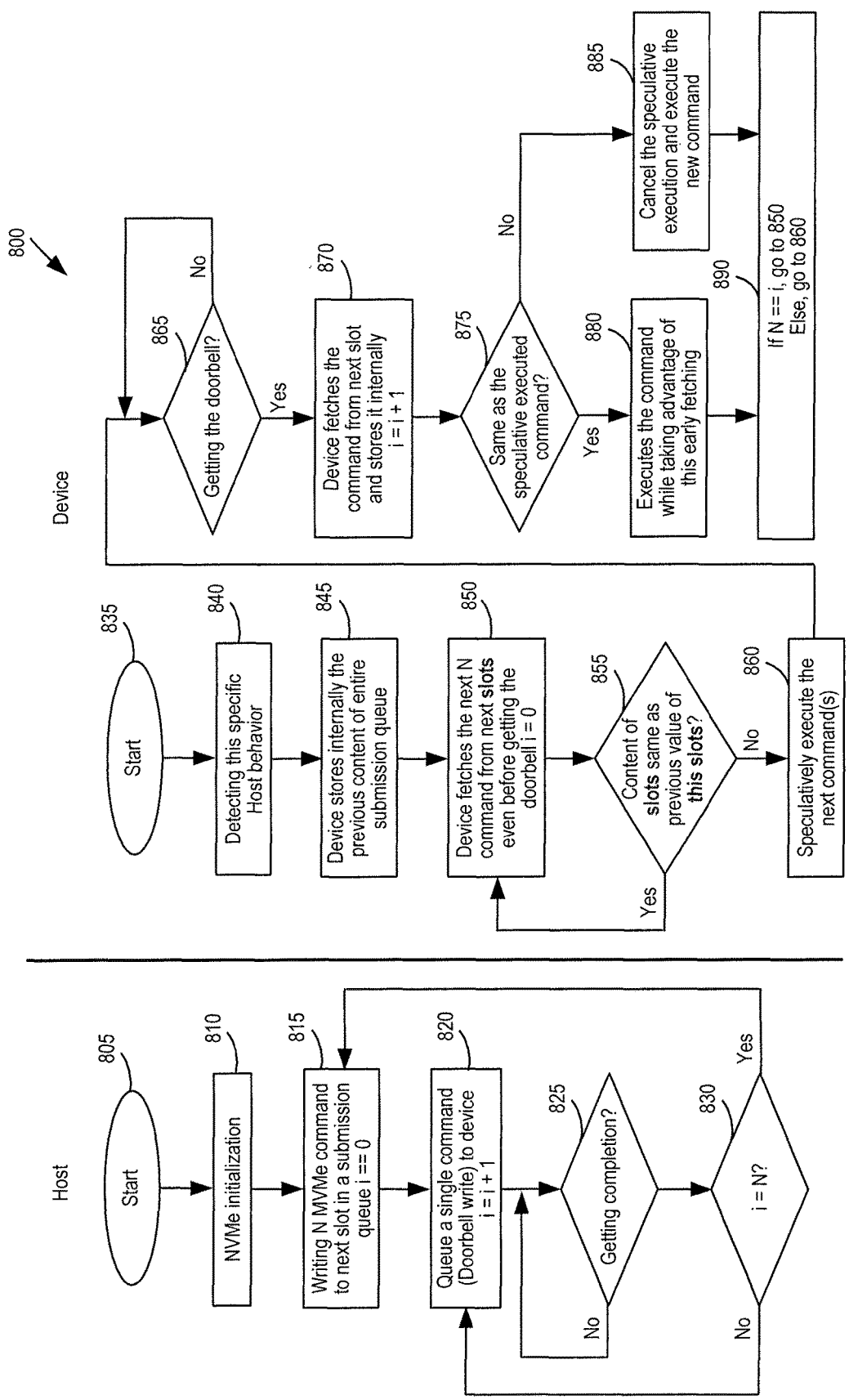
FIG. 8 is a flow chart of a method of an embodiment in which a host updates N next commands in a submission queue and then queues them one by one to a storage device.

The flow chart 800 in FIG. 8 illustrates this embodiment. As shown in FIG. 8, when the method starts (act 805), the host 50 performs NVMe initialization (act 810). The host 50 then writes N NVMe commands to the next slot in a submission queue and sets i=0 (act 815). The host 50 next queues a single command (doorbell write) to the storage device 100 and sets i=i+1 (act 820). The host 50 then determines if it is getting completion (act 825). If it is, the host 50 determines if i=N (act 830) and routes to act 815 or 820, accordingly.

On the storage device 100 side, after the method starts (act 835), the storage device 100 detects this specific host behavior (act 840) and stores internally the previous content of the entire submission queue (act 845). The device 100 then fetches the next N commands from the next slots even before getting the doorbell and sets i=1 (act 850). Next, the storage device 100 determines if the content of the slot is the same as the previous value of the slot (act 855). If it is, the device 100 proceeds to act 850. If it is not, the device 100 speculatively executes the next command(s) (act 860), after which it determines if it is getting the doorbell (act 865). If it gets the doorbell, the device 100 fetches the command from the next slot and stores in internally and sets i=i+1 (act 870). The device 100 then determines if the fetched command is the same as the speculatively executed command (act 875). If it is, the device 100 executes the command while taking advantage of this early fetching (act 880). If it is not, the device 100 cancels the speculative execution and executes the new command (act 885). In either situation, the device 100 next proceeds to act 850 if N–I, or to act 860 if it is not (act 890).

There are several advantages associated with these embodiments. For example, these embodiments can provide a performance boost in random and sequential reads in a low queue depth environment (e.g., depths of 1, 2, or 4). The boost in performance depends on host behavior and could introduce significant improvements, which can be important benchmarks for ranking storage devices.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A storage system comprising:
   a memory; and
   a controller in communication with the memory, wherein the controller is configured to:
      determine a behavior of a host for updating a submission queue;
      before receiving notification from the host that the host has updated the submission queue, begin executing at least one command based on the determined host's behavior;
      receive notification from the host that the host has updated the submission queue;
      determine whether the submission queue has been updated with the at least one command that the controller began executing; and
      in response to determining that the submission queue has been updated with the at least one command that the controller began executing, continue executing the at least one command.

2. The storage system of claim 1, wherein the controller is further configured to:
   in response to determining that the submission queue has not been updated with the at least one command that the controller began executing:
      cancel execution of the at least one command; and
      execute a new command from the submission queue.

3. The storage system of claim 1, wherein the controller is further configured to determine the host's behavior in response to determining that the storage system has a low queue depth.

4. The storage system of claim 1, wherein the controller is further configured to determine the host's behavior by comparing entries in the submission queue before and after receiving notification from the host that the host has updated the submission queue to learn when and how the host updates the submission queue.

5. The storage system of claim 1, wherein:
the determined host's behavior is that the host writes a command to the submission queue only after receiving a completion queue message to a previous command; and
the controller is further configured to poll a next slot in the submission queue until the controller detects that a new command has been posted to the submission queue.

6. The storage system of claim 1, wherein:
the determined host's behavior is that the host writes a command to the submission queue only at an initialization phase of the submission queue; and
the controller is further configured to read the at least one command from the storage system's memory.

7. The storage system of claim 1, wherein:
the determined host's behavior is that the host writes N number of commands to the submission queue and sends N number of notifications to the storage system; and
the controller is further configured to read the N number of commands from the submission queue before receiving notification from the host that the host has updated the submission queue.

8. The storage system of claim 1, wherein the memory comprises a three-dimensional memory.

9. The storage system of claim 1, wherein the storage system is embedded in the host.

10. The storage system of claim 1, wherein the storage system is removably connected to the host.

11. A method for speculative execution of a command, the method comprising:
performing the following in a storage system:
selecting a command from a submission queue before the storage system receives notification that the command has been posted in the submission queue, wherein the command is selected based on learned knowledge of how a host updates the submission queue;
beginning execution of the command;
after receiving a notification from the host that a new command has been posted to the submission queue, determining whether the new command is the command being executed;
in response to determining that the new command is the command being executed, continuing execution of the command; and
in response to determining that the new command is not the command being executed, executing the new command.

12. The method of claim 11, wherein the learned knowledge is obtained by comparing entries in the submission queue before and after receiving notification from the host that the host has updated the submission queue to learn when and how the host updates the submission queue.

13. The method of claim 11, wherein:
the learned knowledge is that the host writes a command to the submission queue only after receiving a completion queue message to a previous command; and
the method further comprises polling a next slot in the submission queue until detecting that the new command has been posted to the submission queue.

14. The method of claim 11, wherein:
the learned knowledge is that the host writes a command to the submission queue only at an initialization phase of the submission queue; and
the method further comprises selecting the command from a memory of the storage system.

15. The method of claim 11, wherein:
the learned knowledge is that the host writes N number of commands to the submission queue and sends N number of notifications to the storage system; and
the method further comprises reading N number of commands from the submission queue before receiving notification from the host that the host has updated the submission queue.

16. A storage system comprising:
means for selecting a command from a submission queue before the storage system receives notification that the command has been posted in the submission queue, wherein the command is selected based on learned behavior of a host;
means for beginning execution of the command; and
means for determining, after receiving a notification from the host that a new command has been posted to the submission queue, whether the new command is the command being executed.

17. The storage system of claim 16, wherein the behavior is learned by comparing entries in the submission queue before and after receiving notification from the host that the host has updated the submission queue to learn when and how the host updates the submission queue.

18. The storage system of claim 16, wherein:
the learned behavior is that the host writes a command to the submission queue only after receiving a completion queue message to a previous command; and
the storage system further comprises means for polling a next slot in the submission queue until detecting that the new command has been posted to the submission queue.

19. The storage system of claim 16, wherein:
the learned behavior is that the host writes a command to the submission queue only at an initialization phase of the submission queue; and
the storage system further comprises means for selecting the command from a memory of the storage system.

20. The storage system of claim 16, wherein:
the learned behavior is that the host writes N number of commands to the submission queue and sends N number of notifications to the storage system; and
the storage system further comprises means for reading N number of commands from the submission queue before receiving notification from the host that the host has updated the submission queue.

* * * * *